United States Patent
Makino et al.

(10) Patent No.: US 9,598,075 B2
(45) Date of Patent: Mar. 21, 2017

(54) VEHICLE-BEHAVIOR CONTROL APPARATUS AND VEHICLE-BEHAVIOR CONTROL SYSTEM

(71) Applicants: AISIN SEIKI KABUSHIKI KAISHA, Kariya-shi, Aichi (JP); TOYOTA JIDOSHA KABUSHIKI KAISHA, Toyota-shi, Aichi (JP)

(72) Inventors: Takafumi Makino, Nagoya (JP); Yoshiaki Tsuchiya, Miyoshi (JP)

(73) Assignees: AISIN SEIKI KABUSHIKI KAISHA, Kariya-Shi, Aichi (JP); TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 30 days.

(21) Appl. No.: 14/775,599

(22) PCT Filed: Mar. 26, 2014

(86) PCT No.: PCT/JP2014/058593
§ 371 (c)(1),
(2) Date: Sep. 11, 2015

(87) PCT Pub. No.: WO2014/168009
PCT Pub. Date: Oct. 16, 2014

(65) Prior Publication Data
US 2016/0023655 A1    Jan. 28, 2016

(30) Foreign Application Priority Data

Apr. 9, 2013    (JP) .................................. 2013-081564

(51) Int. Cl.
*B60W 30/09* (2012.01)
*B60W 10/22* (2006.01)
(Continued)

(52) U.S. Cl.
CPC ............ *B60W 30/09* (2013.01); *B60G 17/016* (2013.01); *B60G 17/0164* (2013.01);
(Continued)

(58) Field of Classification Search
CPC .. B60W 10/18; B60W 10/184; B60W 10/20; B60W 10/22; B60W 2250/10; B60W 2550/306; B60W 2550/308; B60W 2710/18; B60W 2710/182; B60W 2710/205; B60W 2710/207; B60W 2710/226; B60W 30/045; B60W 30/09; B60W 30/095; B60G 17/016; B60G 17/0164; B60G 17/08; B60G 2400/823; B60G 2500/10; B60G 800/242; B60T 2201/022; B60T 7/12; B60T 7/22; B62D 15/0265; B62D 7/159; G08G 1/166
USPC ................................ 701/37, 41, 48, 70, 301
See application file for complete search history.

(56) References Cited

U.S. PATENT DOCUMENTS 4,720,790 A * 1/1988 Miki ...................... B62D 7/159
180/415

(Continued)

FOREIGN PATENT DOCUMENTS

| JP | 10-138894 A | 5/1998 |
| JP | 2001-191820 A | 7/2001 |

(Continued)

OTHER PUBLICATIONS

International Search Report (PCT/ISA/210) mailed on Jun. 24, 2014, by the Japanese Patent Office as the International Searching Authority for International Application No. PCT/JP2014/058593.

(Continued)

*Primary Examiner* — Tyler J Lee
(74) *Attorney, Agent, or Firm* — Buchanan Ingersoll & Rooney PC

(57) ABSTRACT

A vehicle-behavior control apparatus according to an embodiment includes a collision determining unit that determines whether a vehicle collides with an obstacle when the vehicle is decelerated while going straight based on at least a detection result of the obstacle in front of the vehicle and a detection result of a running state of the vehicle in a condition in which wheels are being braked, and a vehicle-behavior control unit that performs at least one of the control of steering rear wheels and the control of giving a difference in braking conditions between the left and right wheels such that the vehicle is decelerated while detouring around the obstacle without steering front wheels when it is determined to collide with the obstacle by the collision determining unit, as one example.

14 Claims, 8 Drawing Sheets

(51) Int. Cl.
| | |
|---|---|
| *B60W 10/20* | (2006.01) |
| *B60W 10/184* | (2012.01) |
| *B62D 15/02* | (2006.01) |
| *G08G 1/16* | (2006.01) |
| *B62D 7/15* | (2006.01) |
| *B60T 7/22* | (2006.01) |
| *B60G 17/016* | (2006.01) |
| *B60G 17/08* | (2006.01) |
| *B60T 7/12* | (2006.01) |
| *B60W 10/18* | (2012.01) |
| *B60W 30/095* | (2012.01) |
| *B60W 30/045* | (2012.01) |

(52) U.S. Cl.
CPC ............... *B60G 17/08* (2013.01); *B60T 7/12* (2013.01); *B60T 7/22* (2013.01); *B60W 10/18* (2013.01); *B60W 10/184* (2013.01); *B60W 10/20* (2013.01); *B60W 10/22* (2013.01); *B60W 30/095* (2013.01); *B62D 7/159* (2013.01); *B62D 15/0265* (2013.01); *G08G 1/166* (2013.01); *B60G 2400/823* (2013.01); *B60G 2500/10* (2013.01); *B60G 2800/242* (2013.01); *B60T 2201/022* (2013.01); *B60W 30/045* (2013.01); *B60W 2550/10* (2013.01); *B60W 2550/306* (2013.01); *B60W 2550/308* (2013.01); *B60W 2710/18* (2013.01); *B60W 2710/182* (2013.01); *B60W 2710/205* (2013.01); *B60W 2710/207* (2013.01); *B60W 2710/226* (2013.01)

(56) References Cited

U.S. PATENT DOCUMENTS

| | | | | |
|---|---|---|---|---|
| 4,778,023 | A * | 10/1988 | Sugasawa | B62D 7/159 180/415 |
| 5,307,891 | A * | 5/1994 | Shaw | B62D 7/1509 180/400 |
| 5,314,037 | A * | 5/1994 | Shaw | B60K 23/08 180/169 |
| 7,016,783 | B2 * | 3/2006 | Hac | B60K 31/0008 180/167 |
| 2001/0020217 | A1 | 9/2001 | Matsuno | |
| 2003/0195684 | A1 * | 10/2003 | Martens | B60K 28/16 701/41 |
| 2004/0030498 | A1 | 2/2004 | Knoop et al. | |
| 2004/0193374 | A1 * | 9/2004 | Hac | B60K 31/0008 701/301 |
| 2006/0224288 | A1 * | 10/2006 | Mattes | B60R 21/0132 701/45 |
| 2007/0124051 | A1 | 5/2007 | Fujita | |
| 2008/0319610 | A1 | 12/2008 | Oechsle et al. | |
| 2010/0049375 | A1 | 2/2010 | Tanimoto | |

FOREIGN PATENT DOCUMENTS

| | | |
|---|---|---|
| JP | 2001-247023 A | 9/2001 |
| JP | 2002-274409 A | 9/2002 |
| JP | 2002-293173 A | 10/2002 |
| JP | 2004-521026 A | 7/2004 |
| JP | 2007-45356 A | 2/2007 |
| JP | 2007-145175 A | 6/2007 |
| JP | 2008-529867 A | 8/2008 |
| JP | 2008-260390 A | 10/2008 |
| JP | 2009-280102 A | 12/2009 |
| JP | 2011-152884 A | 8/2011 |
| JP | 2014-201291 A | 10/2014 |
| WO | WO 2008/136456 A1 | 11/2008 |

OTHER PUBLICATIONS

Written Opinion (PCT/ISA/237) mailed on Jun. 24, 2014, by the Japanese Patent Office as the International Searching Authority for International Application No. PCT/JP2014/058593.

Office Action (Notification of Reason for Refusal) issued on Aug. 4, 2015, by the Japanese Patent Office in corresponding Japanese Patent Application No. 2013-081564, and an English Translation of the Office Action. (8 pages).

* cited by examiner

VEHICLE-BEHAVIOR CONTROL APPARATUS AND VEHICLE-BEHAVIOR CONTROL SYSTEM

CROSS-REFERENCE TO RELATED APPLICATIONS

This application is national stage application of International Application No. PCT/JP2014/058593, filed Mar. 26, 2014, which designates the United States, incorporated herein by reference, and which claims the benefit of priority from Japanese Patent Application No. 2013-081564, filed Apr. 9, 2013, the entire contents of which are incorporated herein by reference.

TECHNICAL FIELD

Embodiments relate to a vehicle-behavior control apparatus and a vehicle-behavior control system.

BACKGROUND ART

Conventionally, known is a technology to avoid colliding with an obstacle by the control of braking and steering.

CITATION LIST

Patent Literature

Patent Document 1: Japanese Patent Application Laid-open No. 2011-152884
Patent Document 2: Japanese Patent Application Laid-open No. 2002-293173

DISCLOSURE OF INVENTION

Problem to be Solved by the Invention

In this sort of technology, it is desirable that, by appropriately controlling the braking and steering, the collision or contact with an obstacle is avoided more effectively.

Means for Solving Problem

According to the embodiments, as one example, a vehicle-behavior control apparatus comprises: a collision determining unit that determines whether a vehicle collides with an obstacle when the vehicle is decelerated while going straight based on at least a detection result of the obstacle in front of the vehicle and a detection result of a running state of the vehicle in a condition in which wheels are being braked; and a vehicle-behavior control unit that performs at least one of control of steering rear wheels and control of giving a difference in braking conditions between left and right wheels such that the vehicle is decelerated while detouring around the obstacle without steering front wheels when it is determined to collide with the obstacle by the collision determining unit.

Consequently, according to the present embodiments, depending on the running state of the vehicle in the condition in which the wheels are being braked, the probability of collision between the vehicle and the obstacle is likely to be determined with higher accuracy, as one example. Furthermore, by the steering control of the rear wheels or the control of giving a difference in the braking conditions of the left and right wheels, the vehicle is more likely to detour around the obstacle, as one example.

According to the vehicle-behavior control apparatus, as one example, the vehicle-behavior control unit prioritizes an operation by a driver over the control by the vehicle-behavior control unit when the operation by the driver is detected.

Consequently, the control that is different from the operation by a driver is likely to be restrained from being performed by the vehicle-behavior control unit, as one example.

According to the vehicle-behavior control apparatus, as one example, when a steering direction of the rear wheels at the time the operation by the driver is detected and a steering control direction of the rear wheels corresponding to the operation by the driver are different from each other, the vehicle-behavior control unit performs the control to steer the rear wheels more moderately as compared with when the steering direction of the rear wheels at the time the operation by the driver is detected and the steering control direction of the rear wheels corresponding to the operation by the driver are same.

Consequently, the control in response to the operation by the driver is likely to be performed more effectively or more reliably while the vehicle is maintained in a more stable condition, as one example.

According to the vehicle-behavior control apparatus, as one example, the vehicle-behavior control unit makes time to perform control shorter as a speed of the vehicle is in a higher state based on the detection result of the running state of the vehicle.

Consequently, the control of avoiding the collision with the obstacle is restrained from being wastefully performed (continued) after the collision with the obstacle has been avoided, as one example.

According to the vehicle-behavior control apparatus, as one example, the vehicle-behavior control unit starts control of braking the rear wheels after starting control of steering the rear wheels.

Consequently, a greater yaw moment entailed in steering the rear wheels is likely to be obtained, as one example.

According to the vehicle-behavior control apparatus, as one example, the vehicle-behavior control unit starts control of braking the rear wheels after starting control of braking the front wheels.

Consequently, the braking of the front wheels is likely to be used for the turn (detour) of the vehicle more efficiently, as one example.

According to the vehicle-behavior control apparatus, as one example, the vehicle-behavior control unit performs control such that the rear wheels are steered at a fixed steering speed regardless of a speed of the vehicle.

Consequently, a greater yaw moment entailed in steering the rear wheels is likely to be obtained, as one example.

According to the vehicle-behavior control apparatus, as one example, operation of a braking system that brakes the wheels differs between when control of detour and deceleration is performed by the vehicle-behavior control unit and when the vehicle is stopped without detouring.

Consequently, the behavior of the vehicle is likely to be controlled more effectively or more reliably, as one example.

According to the vehicle-behavior control apparatus, as one example, the vehicle-behavior control unit further controls damping characteristics of a suspension device of the wheel.

Consequently, by the control of the damping characteristics of the suspension devices, the behavior of the vehicle is likely to be controlled more effectively or more reliably, as one example.

According to the vehicle-behavior control apparatus, as one example, the collision determining unit detects the running state of the vehicle, and determines whether collision with the obstacle occurs depending on at least one of a detection result of rotational speed of the wheels, operating conditions of braking devices of the wheels, and a detection result of acceleration of the vehicle.

Consequently, the probability of collision between the vehicle and the obstacle is likely to be determined with higher accuracy, as one example.

According to the embodiments, as one example, a vehicle-behavior control apparatus comprises: a collision determining unit that determines whether collision with an obstacle occurs based on at least one of a detection result of the obstacle in front of a vehicle and a detection result of a running state of the vehicle; and a vehicle-behavior control unit that performs at least one of control of steering rear wheels and control of giving a difference in braking conditions between left and right wheels such that the vehicle is decelerated while detouring around the obstacle without steering front wheels when it is determined to collide with the obstacle by the collision determining unit.

Consequently, according to the embodiments, by the steering control of the rear wheels or the control of giving a difference in the braking conditions between the left and right wheels, the vehicle is more likely to detour around the obstacle, as one example.

According to the embodiments, as one example, the vehicle-behavior control apparatus further comprises: an obstacle detection unit that detects the obstacle in front of the vehicle; and a running-state detection unit that detects the running state of the vehicle.

Consequently, according to the embodiments, the detection of the obstacle and running state is likely to be performed with high accuracy and rapidity, as one example.

According to the embodiments, as one example, a vehicle-behavior control system comprises: a data acquisition unit that acquires data to be a source of detecting an obstacle in front of a vehicle; a steering device of rear wheels; a braking device of wheels; and a control device including a collision determining unit that determines whether the vehicle collides with the obstacle when the vehicle is decelerated while going straight based on at least a detection result of the obstacle and a detection result of a running state of the vehicle in a condition in which the wheels are being braked, and a vehicle-behavior control unit that performs at least one of control of steering the rear wheels and control of giving a difference in braking conditions between left and right wheels such that the vehicle is decelerated while detouring around the obstacle without steering front wheels when it is determined to collide with the obstacle by the collision determining unit.

Consequently, according to the embodiments, depending on the running state of the vehicle under the condition in which the wheels are being braked, the probability of collision between the vehicle and the obstacle is likely to be determined with higher accuracy, as one example. Furthermore, by the steering control of the rear wheels or the control of giving a difference in the braking conditions between the left and right wheels, the vehicle is more likely to detour around the obstacle, as one example.

According to the embodiments, as one example, the vehicle-behavior control system further comprises an actuator that controls damping characteristics of a suspension device of the wheel.

Consequently, by the control of the damping characteristics of the suspension device, the behavior of the vehicle is likely to be controlled more effectively or more reliably, as one example.

According to the embodiments, as one example, the vehicle-behavior control apparatus further comprises: an obstacle detection unit that detects the obstacle in front of the vehicle; and a running-state detection unit that detects the running state of the vehicle.

Consequently, according to the embodiments, the detection of the obstacle and running state is likely to be performed with high accuracy and rapidity, as one example.

BEST MODE FOR CARRYING OUT THE INVENTION

Figure 1:
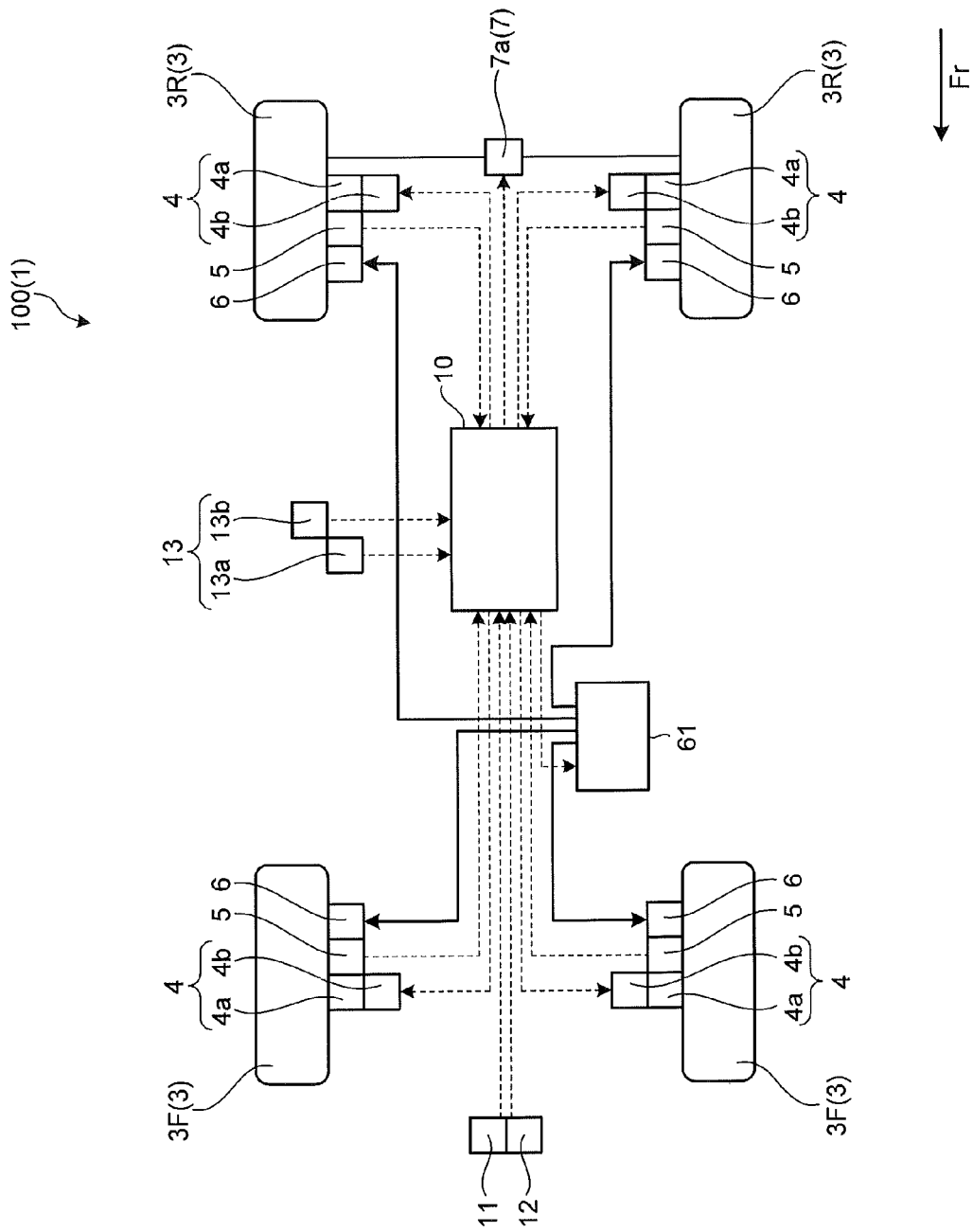
FIG. 1 is a schematic diagram illustrating a general configuration of one example of a vehicle-behavior control system according to an embodiment.

In a present exemplary embodiment, a vehicle 1 may be an automobile with an internal combustion engine (an engine, not depicted) as a driving source (an internal-combustion engine vehicle), may be an automobile with an electric motor (a motor, not depicted) as a driving source (an electric vehicle, a fuel-cell vehicle, and others), or may be an automobile with both of the foregoing as a driving source (a hybrid vehicle), for example. The vehicle 1 can be equipped with a transmission of various types, and can be equipped with various devices (systems, components, and others) necessary to drive the internal combustion engine or the electric motor. The method, the number, the layout, and others of the devices concerning the drive of wheels 3 in the vehicle 1 can be configured in various ways. In the embodiment, the vehicle 1 is a four-wheeled vehicle (a four-wheeled automobile), and includes two right and left front wheels 3F and two right and left rear wheels 3R, as one example. In FIG. 1, the front (direction Fr) in the front-back direction of the vehicle is on the left side.

In the embodiment, a vehicle-behavior control system 100 (a collision-avoidance control system or an automatic detour and deceleration system) of the vehicle 1 includes a control device 10, an image pickup device 11, a radar device 12, acceleration sensors 13a and 13b (13), a braking system 61, and others, as one example. The vehicle-behavior control system 100 further includes, corresponding to the respective two front wheels 3F, suspension devices 4, rotation sensors 5, braking devices 6, and others and includes, corresponding to the respective two rear wheels 3R, the suspension devices 4, the rotation sensors 5, the braking devices 6, a steering device 7, and others. The rotation sensors 5, the acceleration sensors 13, the braking system 61 (braking devices 6), and others are examples of a running-state detection unit that detects the running state of the vehicle 1. While the vehicle 1 includes, other than those illustrated in FIG. 1, basic constituent elements as the vehicle 1, only the configuration concerning the vehicle-behavior control system 100 and the control concerning the configuration thereof will be described here.

The control device 10 (a control unit) receives signals, data, and others from the various units in the vehicle-behavior control system 100, and performs the control of the respective units of the vehicle-behavior control system 100. In the embodiment, the control device 10 is one example of a vehicle-behavior control apparatus. The control device 10 is configured as a computer, and includes an arithmetic processor (a micro-computer, an electronic control unit (ECU), and others, not depicted), a storage unit 10j (for example, a read only memory (ROM), a random access memory (RAM), and a flash memory, see FIG. 2), and others. The arithmetic processor can read out a program stored (installed) in the non-volatile storage unit 10j (for example, the ROM and the flash memory), execute arithmetic processing in accordance with the program, and function (operate) as various units illustrated in FIG. 2. In the storage unit 10j, the data (tables (groups of data), functions, and others) that is used in various calculations concerning the control, the calculation results thereof (including values in the course of calculation), and others can be stored.

Figure 4:
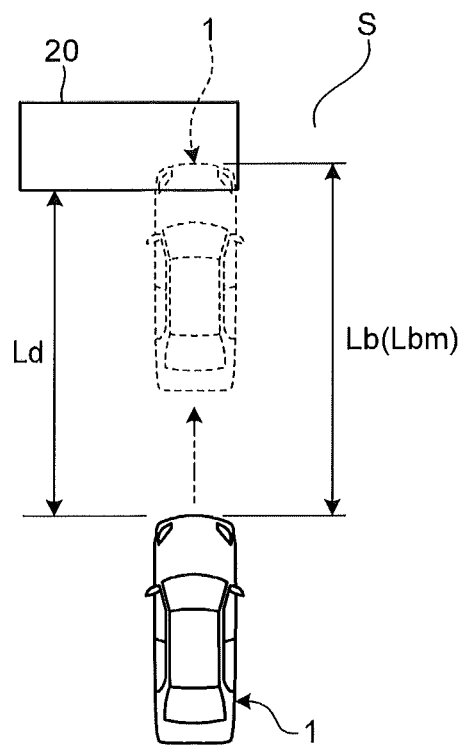
FIG. 4 is a schematic diagram (a bird's eye view) illustrating one example of a situation in which the vehicle-behavior control system in the embodiment determines that a vehicle collides with an obstacle when the vehicle is decelerated while going straight.

The image pickup device 11 (an image pickup unit) is a digital camera that has a built-in imaging element such as a charge coupled device (CCD) and a CMOS image sensor (CIS), for example. The image pickup device 11 can output image data (moving image data or frame data) at a given frame rate. In the embodiment, as one example, the image pickup device 11 can be positioned at an end portion (an end portion in a planar view) on the front side (on the front side in the front-back direction of the vehicle) of a vehicle body (not depicted) and mounted on a front bumper and the like, for example. The image pickup device 11 then outputs image data including an obstacle 20 (see FIG. 4) that is in front of the vehicle 1. The image data is one example of data to be a source of detecting the obstacle 20. The image pickup device 11 is one example of an obstacle detection unit and a data acquisition unit.

The radar device 12 (a radar unit) is a millimeter-wave radar device, for example. The radar device 12 can output distance data indicative of a distance Ld up to the obstacle 20 (a clearance or a detection distance, see FIG. 4), speed data indicative of a relative speed (velocity) with respect to the obstacle 20, and others. The distance data and the speed data are examples of data to be a source of detecting the obstacle 20. The radar device 12 is one example of an obstacle detection unit and a data acquisition unit. The control device 10 can update the measurement result of the distance Ld between the vehicle 1 and the obstacle 20 performed by the radar device 12 and store it into the storage unit 10j as needed (for example, at a fixed time interval), and use the updated measurement result of the distance Ld in calculation.

The acceleration sensor 13 can detect the acceleration of the vehicle 1. In the embodiment, as the acceleration sensors 13, the vehicle 1 is provided with the acceleration sensor 13a that acquires the acceleration in the front-back direction (longitudinal direction) of the vehicle 1, and with the acceleration sensor 13b that acquires the acceleration in the width direction (vehicle width direction, short direction, or left-right direction) of the vehicle 1, as one example.

The suspension device 4 (suspension) is interposed between the wheel 3 and the vehicle body (not depicted) and restrains the vibrations and shocks from the road surface from being transmitted to the vehicle body. In the embodiment, the suspension device 4 includes a shock absorber 4a the damping characteristics of which are electrically controllable (adjustable), as one example. Consequently, the control device 10 can vary (change, switch, or variably set) the damping characteristics of the shock absorber 4a (the suspension device 4) by controlling an actuator 4b by an instruction signal. The suspension device 4 is provided on each of the four wheels 3 (the two front wheels 3F and the two rear wheels 3R), and the control device 10 can control the damping characteristics of the four respective wheels 3. The control device 10 can control the four wheels 3 into a situation in which the damping characteristics thereof are different from one another.

The rotation sensor 5 (a rotation speed sensor, an angular velocity sensor, or a wheel sensor) can output a signal corresponding to the rotational speed (an angular velocity, a revolving speed, or a rotational state) of each of the four wheels 3. The control device 10 can acquire, from the detection results of the rotation sensors 5, a slip ratio of each of the four wheels 3, and can determine whether the wheels are in a locked state. The control device 10 can also acquire the speed of the vehicle 1 from the detection results of the rotation sensors 5. Separate from the rotation sensors 5 for the wheels 3, a rotation sensor (not depicted) that detects the rotation of a crankshaft, an axle, and the like may be provided, and the control device 10 may acquire the speed of the vehicle 1 from the detection result of this rotation sensor.

The braking devices 6 (brakes) are provided on the four respective wheels 3, and brake the corresponding wheels 3. In the embodiment, the braking devices 6 are controlled by the braking system 61, as one example, and the braking system 61 can be configured as an anti-lock braking system (ABS), as one example.

The steering device 7 steers the rear wheels 3R. The control device 10 can vary (change or switch) the steering angle (a turning angle or a steering wheel angle) of the rear wheels 3R by controlling an actuator 7a by an instruction signal.

The configuration of the foregoing vehicle-behavior control system 100 is merely one example after all, and it can be modified and implemented in various ways. As for the individual devices forming the vehicle-behavior control system 100, known devices can be used. The respective components of the vehicle-behavior control system 100 can be shared with other configurations. The vehicle-behavior control system 100 may include a sonar device as an obstacle detection unit and a data acquisition unit.

In the embodiment, the control device 10 can function (operate) as an obstacle detection unit 10a, a side-space detection unit 10b, a driver's operation detection unit 10c, a first collision determining unit 10d, a second collision determining unit 10e, a vehicle-behavior control unit 10f, and others, by the collaboration of hardware and software (programs), as one example. The vehicle-behavior control unit 10f can function (operate) as a braking control unit 10g, a steering control unit 10h, and a damping control unit 10i. That is, the program can include modules corresponding to the respective blocks illustrated in FIG. 2 excluding the storage unit 10j, as one example.

Figure 3:
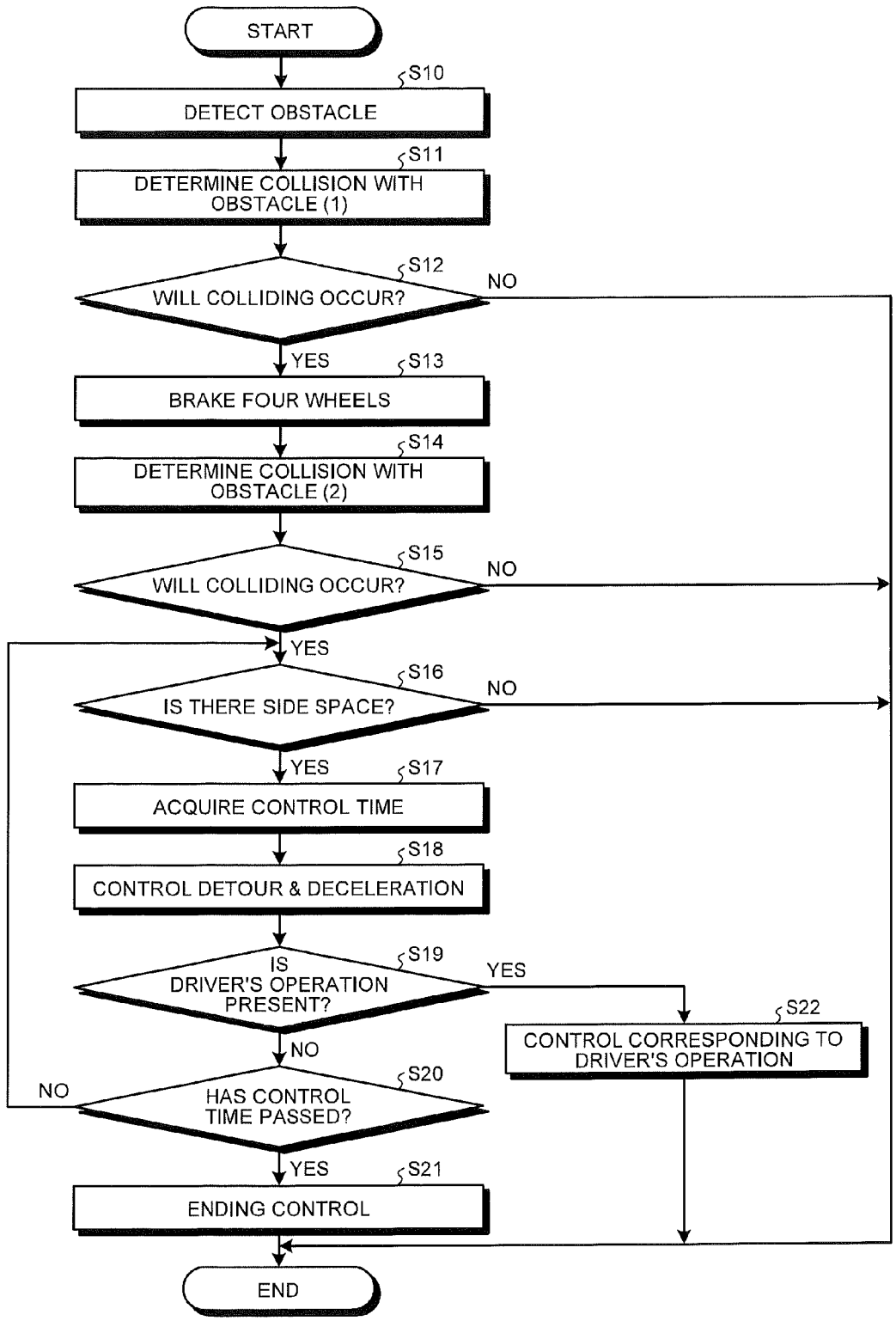
FIG. 3 is a flowchart illustrating one example of a control method performed by the vehicle-behavior control system in the embodiment.

The control device 10 in the embodiment can perform the control of detour and deceleration of the vehicle 1 in a procedure illustrated in FIG. 3, as one example. First, the control device 10 functions as the obstacle detection unit 10a and detects the obstacle 20 (see FIG. 4) that is in front of the vehicle 1 (Step S10). At this Step S10, on the obstacle 20 that conforms to a predetermined condition (for example, the size), the control device 10 acquires the position thereof (the distance Ld from the vehicle 1) from the data acquired from the image pickup device 11, the radar device 12, and others.

The control device 10 then functions as the first collision determining unit 10d, and determines whether the vehicle 1, when the vehicle 1 is decelerated (braking controlled) while going straight, collides with the obstacle 20 detected at Step S10 (Step S11). At this Step S11, the control device 10 acquires the speed of the vehicle 1 at that time point, refers to the data (for example, tables and functions) stored in the storage unit 10j (for example, the ROM and flash memory) and indicative of the correspondence relation between the speed (a vehicle speed) and a stopping distance Lb (a braking distance, or a travelling distance needed until the vehicle 1 stops when the vehicle 1 is decelerated (braking controlled) while going straight, see FIG. 4), and acquires the stopping distance Lb corresponding to the acquired speed of the vehicle 1, for example. The control device 10 then compares the stopping distance Lb with the distance Ld and, if the stopping distance Lb is equal to the distance Ld or is longer (greater) than the distance Ld (Yes at Step S12, it is determined to collide (or have a possibility of colliding or have a high probability of colliding)), performs the processing at Step S13. On the other hand, if the stopping distance Lb is shorter (smaller) than the distance Ld (No at Step S12, it is determined to not collide (or have no possibility of colliding or have a low probability of colliding)), the control device 10 ends a series of processing.

At Step S13, the control device 10 functions as the braking control unit 10g, controls the braking devices 6 of the respective wheels 3 via the braking system 61, and brakes the four wheels 3 (as one example, full braking).

The control device 10 then functions as the second collision determining unit 10e, and determines again whether the vehicle 1, when the vehicle 1 is decelerated (braking controlled) in a state of going straight, collides with the obstacle 20 (Step S14). This Step S14 is performed in a situation that the four wheels 3 (the four wheels 3, as one example in the embodiment) are being braked. That is, at this Step S14, the control device 10 can determine with higher accuracy the probability of collision by reflecting the respective braking conditions (the rotational states of the wheels 3, the running state of the vehicle 1, and the responses of the various units to the braking control input) of the four wheels 3 by the braking control. Specifically, the control device 10 can calculate with higher accuracy a stopping distance Lbm that is more suited to the condition of the road surface on which the vehicle 1 is running, based on the detection result of the rotation sensors 5 of the respective wheels 3, the operating condition (the operation timing of the ABS, as one example) of the braking devices 6 (the braking system 61) corresponding to the respective wheels 3, the detection result of the acceleration sensors 13 (the magnitude and direction of the acceleration (deceleration) of the vehicle 1), and others, for example. The control device 10 can further use, for the determination, a friction coefficient (a friction condition, a slip ratio, or a parameter corresponding to friction) of road surface calculated from the acquired parameters, and the stopping distance Lbm corresponding to the acceleration (deceleration). In this case, for the calculation of the stopping distance Lbm in the control device 10, tables (groups of data), functions, and the like are used. The tables and functions can be stored in the storage unit 10j (for example, the ROM and flash memory). The table can be a group of data indicative of the correspondence relation between the speed (vehicle speed) and the stopping distance stored for each of a plurality of friction coefficients, as one example. In the embodiment, the stopping distance Lb calculated at Step S11 and the stopping distance Lbm calculated at Step S14 may differ. At Step S11 and at Step S14, as for a module (a subroutine or a function) of the program, the use of the same module is also possible.

The control device 10 then compares the stopping distance Lbm with the distance Ld and, if the stopping distance Lbm is equal to the distance Ld or is longer (greater) than the distance Ld (Yes at Step S15, it is determined to collide (or have a possibility of colliding or have a high probability of colliding)), performs the processing at Step S16. On the other hand, if the stopping distance Lbm is shorter (smaller) than the distance Ld (No at Step S15, it is determined to not collide (or have no possibility of colliding or have a low probability of colliding)), the control device 10 ends a series of processing.

At Step S16, the control device 10 functions as the side-space detection unit 10b, and determines whether there is a space S (see FIGS. 4 and 5) where the vehicle 1 can move on the lateral side of the obstacle 20 (Step S16). At this Step S16, the control device 10 can determine the area in which the obstacle 20 is not detected is the space S, as one example. At S16, if it is determined that there is the space S where the vehicle 1 can move on the lateral side of the obstacle 20 (Yes at Step S16), the control device 10 functions as the vehicle-behavior control unit 10f and performs the processing at Step S17. On the other hand, at S16, if there is no space where the vehicle 1 can move on the lateral side of the obstacle 20 (No at Step S16), a series of processing is ended.

Figure 5:
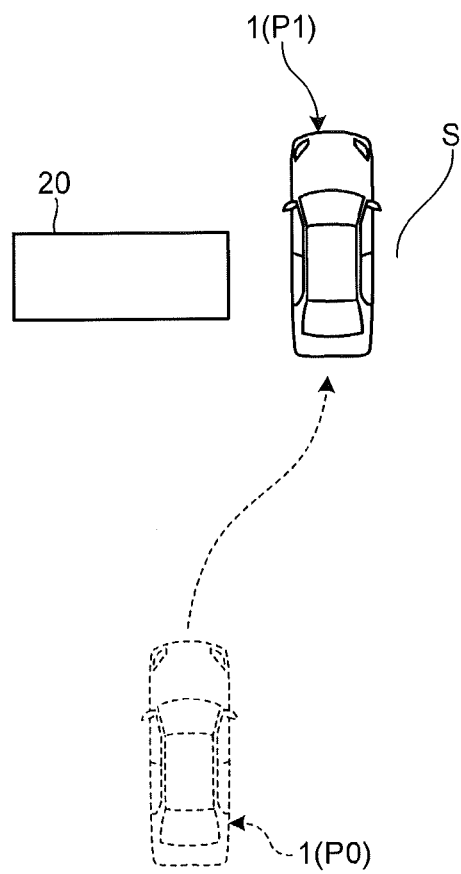
FIG. 5 is a schematic diagram (a bird's eye view) illustrating one example of the behavior of the vehicle controlled by the vehicle-behavior control system in the embodiment.
Figure 6:
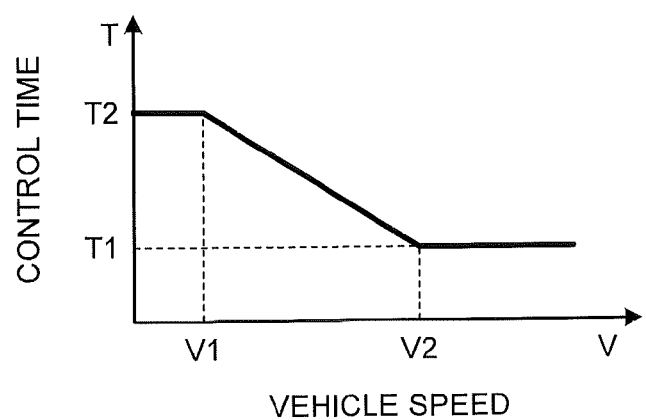
FIG. 6 is a graphic chart illustrating one example of setting of control time during which the control of detour and deceleration is performed corresponding to a vehicle speed in the vehicle-behavior control system in the embodiment.

If it is determined that there is the space S where the vehicle 1 can move on the lateral side of the obstacle 20 at Step S16 (Yes at Step S16), the control device 10 functions as the vehicle-behavior control unit 10f and acquires first a control time T (time of performing control, a time period of control, a length of control time, or control ending time) to perform the control of detour and deceleration at subsequent Step S18 (Step S17). At this Step S17, a table (a group of data), a function, and the like from which the control time T corresponding to a vehicle speed V can be obtained as illustrated in FIG. 6 is used, as one example. That is, the vehicle-behavior control unit 10f acquires the control time T corresponding to the vehicle speed V based on a table, a function, and the like. As illustrated in FIG. 6, in the embodiment, as one example, the control time T is set shorter as the vehicle speed V is higher. This is because the higher vehicle speed V results in the shorter time to move from a current position P0 (see FIG. 5) to a position P1 (see FIG. 5) detouring around the obstacle 20. Furthermore, in the embodiment, the control time T can be defined as the time required for the vehicle 1, which is in a state of running on a lane defined on a road (for example, a highway) at the vehicle speed V, to move on to the next lane, as one example. In this case also, because the time required to move between the lanes becomes shorter as the vehicle speed V is higher, the vehicle speed V and the control time T have the relation as illustrated in FIG. 6. Consequently, according to the embodiment, the control of avoiding collision with the obstacle 20 is likely to be restrained from being wastefully performed (continued) to the vehicle 1 after the collision with the obstacle 20 has been avoided, as one example. This Step S17 is performed only at the first timing (the first time), and is not performed at the second and subsequent timing of the loop of Step S16 to Step S20, as one example. The position of the vehicle 1 that is the base of calculating the control time T is not limited to the position illustrated in FIG. 5. The vehicle-behavior control unit 10f can adjust the amount of movement of the vehicle 1 by making the control time T constant, and switching the steering angle or the steering speed in accordance with the vehicle speed V. In this case, the vehicle-behavior control unit 10f makes at least one of the steering angle and the steering speed smaller as the vehicle speed V is higher, as one example. The vehicle-behavior control unit 10f can also switch at least one of the steering angle and the steering speed together with the control time T in accordance with the vehicle speed V, as one example. The steering angle in this control can be a relative steering angle with respect to the steering angle at the time the control is started.

Figure 2:
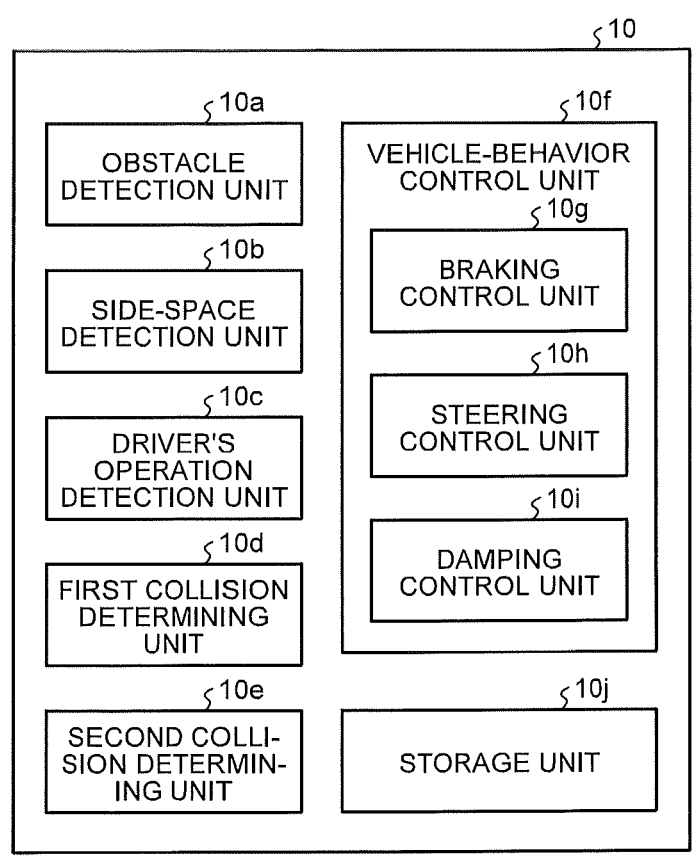
FIG. 2 is a functional block diagram of a vehicle-behavior control apparatus of the one example of the vehicle-behavior control system in the embodiment.

At Step S18, the control device 10 functions (operates) as the vehicle-behavior control unit 10f. As illustrated in FIG. 2, the vehicle-behavior control unit 10f includes the braking control unit 10g, the steering control unit 10h, the damping control unit 10i, and others. At this Step S18, the vehicle-behavior control unit 10f controls the various units such that the vehicle 1 is decelerated while detouring around the obstacle 20. Specifically, the vehicle-behavior control unit 10f can function as at least one of the braking control unit 10g, the steering control unit 10h, and the damping control unit 10i such that a yaw moment in a direction of detouring around the obstacle 20 arises on the vehicle 1. For example, as illustrated in FIG. 5, when the space S is detected on the right-hand side of the obstacle 20, the vehicle-behavior control unit 10f controls the various units such that the yaw moment toward the right arises on the vehicle 1 at least at the very start of a detour. The vehicle-behavior control unit 10f can switch (select) itself to function as any unit out of the braking control unit 10g, the steering control unit 10h, and the damping control unit 10i, depending on the situation. The vehicle-behavior control unit 10f can also function (operate) by switching in sequence among the braking control unit 10g, the steering control unit 10h, and the damping control unit 10i.

At Step S18, the vehicle-behavior control unit 10f (the control device 10) functioning as the braking control unit 10g controls the braking system 61 (the braking devices 6) such that the braking force of the wheels 3 (the front wheel 3F and the rear wheel 3R) on the inner side (the right-hand side in the example in FIG. 5) of a detour (a turn) becomes greater (stronger) than the braking force of the wheels 3 on the outer side of the detour (the turn), as one example. Consequently, a greater yaw moment is acted on the vehicle 1 in the direction of the detour (the turn) and may make the vehicle 1 easier to detour around the obstacle 20.

Furthermore, at Step S18, the vehicle-behavior control unit 10f (the control device 10) functioning as the braking control unit 10g controls the braking system 61 (the braking devices 6) so as to operate differently from when the vehicle 1 is stopped (decelerated) without detouring (when stopped (decelerated) normally without detouring, when stopped (decelerated) by a braking operation by a driver, or when the control of detour and deceleration in FIG. 3 is not being performed), as one example. Specifically, at Step S18, the vehicle-behavior control unit 10f controls the braking system 61 such that the braking force of the wheels 3 is smaller as compared with when the vehicle 1 is stopped without detouring, as one example. When the vehicle 1 is stopped without detouring, the braking system 61 (the braking devices 6) operates as the ABS, and intermittently (repeatedly or periodically) changes the braking force by making a peak in the braking force arise a plurality of times at time intervals so as to restrain the wheels 3 from locking. In contrast, at Step S18 in the control of detour and deceleration, the vehicle-behavior control unit 10f performs the control to make the peak of the braking force smaller than when the vehicle 1 is stopped without detouring, to make the peak of the braking force disappear, to make the braking force change moderately (gradually) (making it small, as one example) as compared with when the vehicle 1 is stopped without detouring, or to make the braking force substantially constant. As just described, the operation of the braking system 61 (the braking devices 6) differs between when the vehicle 1 is stopped without detouring and when the control of detour and deceleration to avoid colliding with the obstacle 20 is performed. Consequently, according to the embodiment, the behavior of the vehicle 1 is likely to be controlled more effectively or more reliably, as one example.

Furthermore, at Step S18, the vehicle-behavior control unit 10f (the control device 10) functioning as the steering control unit 10h controls the steering device 7 (the actuator 7a) so as to steer in the direction in which the two rear wheels 3R are in a reverse phase to the detouring (turning) direction, as one example. Consequently, a greater yaw moment is acted on the vehicle 1 in the direction of the detour (the turn) and may make the vehicle 1 easier to detour around the obstacle 20. Even under the braking condition, because the rear wheels 3R are harder to lock (harder to slip) as compared with the front wheels 3F, the steering of the rear wheels 3R contributes to the detouring (turning) of the vehicle 1 more effectively. Hence, in the embodiment, the vehicle-behavior control unit 10f (the control device 10) functioning as the steering control unit 10h, in regard to the control of detour and deceleration in FIG. 3 (automatic control of detouring around the obstacle 20), does not steer (does not let it steer) the front wheels 3F for turning the vehicle 1, as one example. That is, in the embodiment, the front wheels 3F are maintained in a state of being not steered (in a neutral position or at a steering angle at the time of going straight) while performing the control of detour and deceleration in FIG. 3, as one example.

In regard to the control at Step S18, as a result of a series of studies earnestly made by the inventors, it has been revealed that the tuning performance is higher when the braking of the front wheels 3F, the braking of the rear wheels 3R, and the steering of the rear wheels 3R are appropriately combined and performed.

Figure 7:
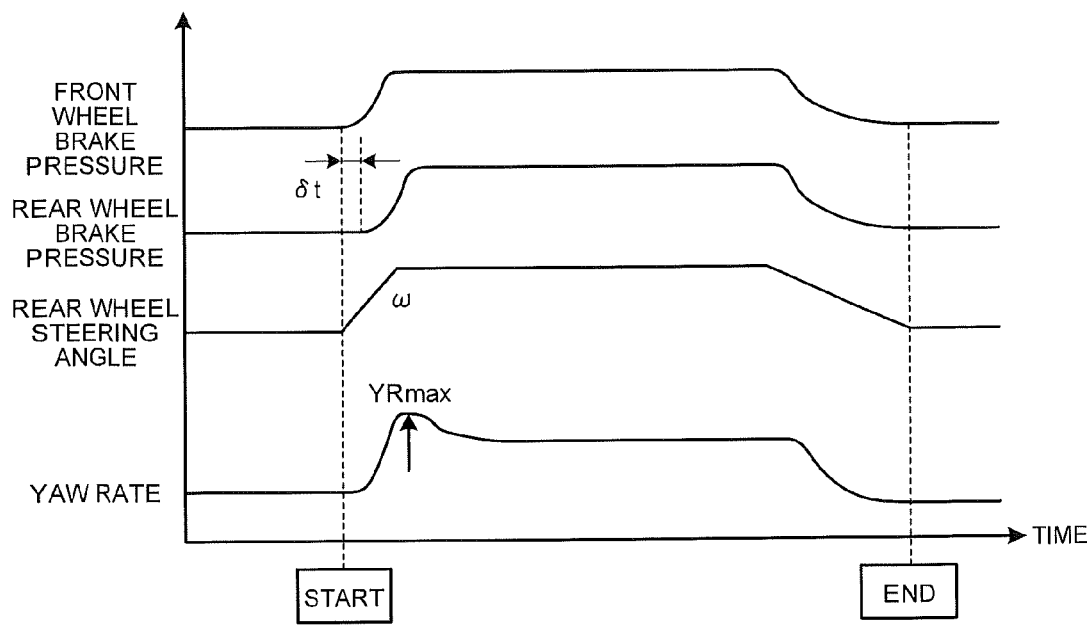
FIG. 7 is a graphic chart illustrating one example of chronological changes in a front-wheel brake pressure, a rear-wheel brake pressure, a rear-wheel steering angle, and a yaw rate in the vehicle-behavior control system in the embodiment.

As a result of a series of studies earnestly made by the inventors, it has been revealed that, as illustrated in FIG. 7, in regard to the control of the rear wheels 3R, a higher effect is likely to be obtained when the rear wheels 3R are braked after passing a delay time δt subsequent to the steering of the rear wheels 3R. When the braking system 61 operates as the ABS, due to the basic structure thereof, a hydraulic pressure is to be released after the wheel 3 is locked once. When the wheel 3 is locked, the force that arises by the steering of that wheel 3 is decreased. That is, when the rear wheels 3R are braked by the ABS while steering the rear wheels 3R, because the rear wheels 3R are temporarily locked, the yaw moment by the steering of the rear wheels 3R may become difficult to obtain. In terms of this, as in the foregoing, when the rear wheels 3R are braked after passing the delay time δt subsequent to the steering of the rear wheels 3R, because the rear wheels 3R can be steered before the rear wheels 3R are being braked and locked, a greater yaw moment (yaw moment of the vehicle 1) entailed in steering the rear wheels 3R is likely to be obtained. Because the front wheels 3F are not steered, it is not necessary to set a delay time and thus, in the embodiment, braking the front wheels 3F can be started before braking the rear wheels 3R, specifically, at substantially the same time as steering the rear wheels 3R, as one example.

Figure 8:
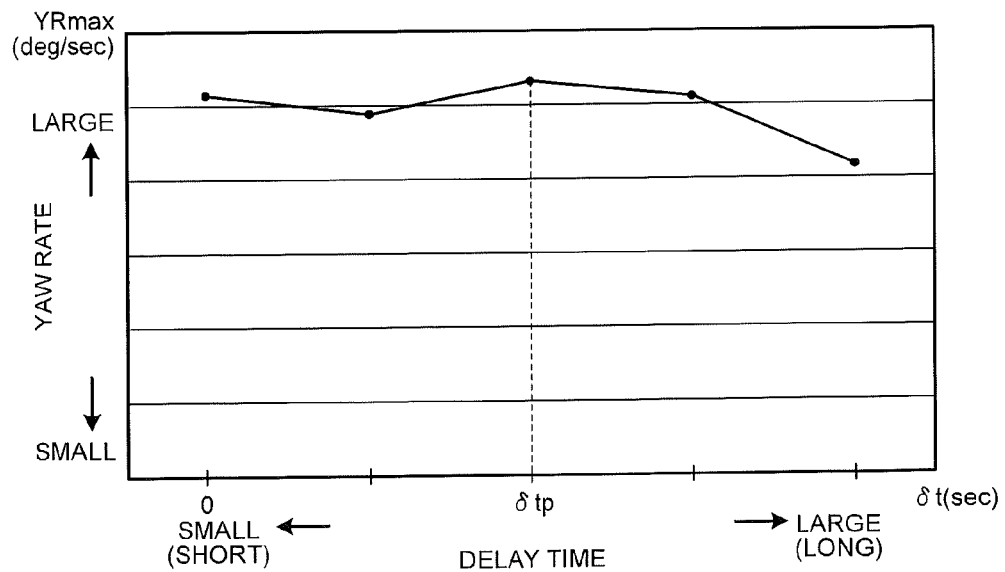
FIG. 8 is a graphic chart illustrating one example of the yaw rate corresponding to a delay time of a braking start on rear wheels with respect to a steering start on the rear wheels in the vehicle-behavior control system in the embodiment.

As a result of a series of studies earnestly made by the inventors, as illustrated in FIG. 8, concerning the above-described delay time δt, the presence of a delay time δtp at which a peak of yaw moment (yaw rate) is obtained has been revealed. The abscissa axis in FIG. 8 represents the delay time δt sec, and the ordinate axis represents a maximum yaw rate YRmax deg/sec (see FIG. 7). Hence, in the embodiment, the delay time δt is set near the delay time δtp that is obtained in advance by experiment or simulation and at which a peak of yaw moment is obtained, as one example.

Figure 9:
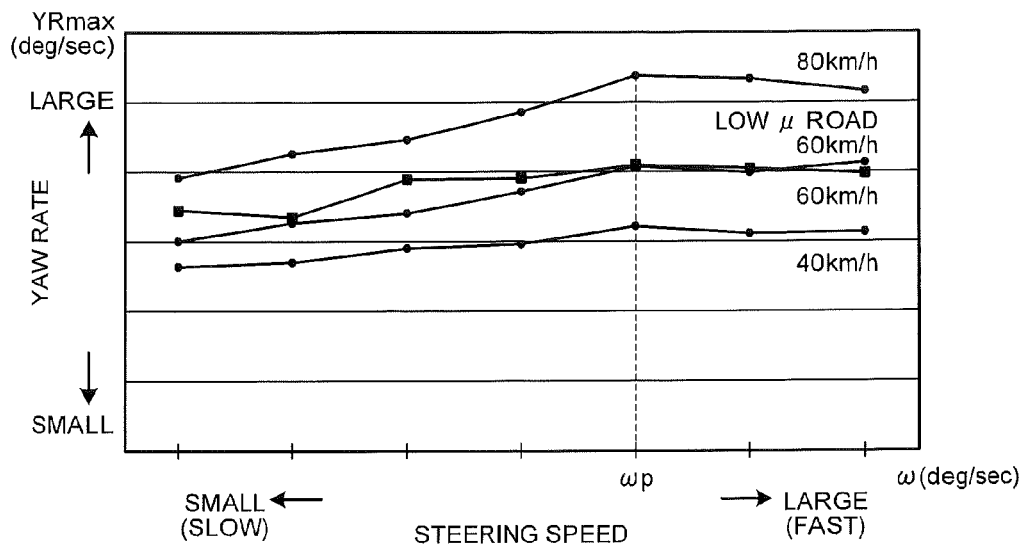
FIG. 9 is a graphic chart illustrating one example of the yaw rate with respect to the steering speed of the rear wheels at a plurality of vehicle speeds in the vehicle-behavior control system in the embodiment.

Moreover, as a result of a series of studies earnestly made by the inventors, as illustrated in FIG. 9, concerning the steering of the rear wheels 3R, the presence of a steering speed ωp (an angular velocity) at which a peak of yaw moment (yaw rate) is obtained has been revealed. The abscissa axis in FIG. 9 represents the steering speed ω deg/sec, and the ordinate axis represents a maximum yaw rate YRmax deg/sec (see FIG. 7). Furthermore, in FIG. 9, the relation between the steering speed ω and the yaw rate YRmax is represented in four cases at the vehicle speeds of 40 km/h, 60 km/h, 60 km/h (under a condition of the friction coefficient μ of road surface being low, however), and 80 km/h. As apparent from FIG. 9, it has been revealed that the steering speed ωp at which a peak of yaw moment is obtained is substantially constant regardless of the condition of vehicle speed and the like. Hence, in the embodiment, the steering speed ω is set near the steering speed ωp that is obtained in advance by experiment or simulation and at which a peak of yaw moment is obtained, as one example.

At Step S18, the vehicle-behavior control unit 10f (the control device 10) functioning as the damping control unit 10i controls the suspension devices 4 (the shock absorbers 4a or the actuators 4b) such that the damping force of the wheels 3 (the front wheel 3F and the rear wheel 3R) on the outer side (the left-hand side in the example in FIG. 5) of a detour (a turn) becomes higher than the damping force of the wheels 3 on the inner side (the right-hand side in the example in FIG. 5) of the detour (the turn), as one example. Consequently, this suppresses the rolling (roll) of the vehicle 1 at the time of the detour (turn), suppresses a decrease in the grip force of the wheels 3 on the road surface, and may make the vehicle 1 easier to detour around the obstacle 20. The control of various units by the vehicle-behavior control unit 10f (the control device 10) at Step S18 can be modified in various ways. It can be further modified with time depending on the position of the vehicle 1 and the situation of the detour (turn).

The control device 10 further functions as the driver's operation detection unit 10c as needed (Step S19). As in the foregoing, in the embodiment, the front wheels 3F are not steered and are maintained in a neutral position while in the control of detour and deceleration, as one example. Consequently, at Step S19, when a steering wheel is steered from the neutral position, the driver's operation detection unit 10c can detect the steering as the operation by the driver, as one example. Then, at Step S19, when the operation by the driver is detected (Yes at Step S19), the vehicle-behavior control unit 10f prioritizes the operation by the driver and performs, in place of the control of detour and deceleration, the control in response to the operation by the driver (Step S22). That is, in the embodiment, when the operation by the driver (the operation of the steering wheel by the driver or the steering of the front wheels 3F based on that operation, as one example) is detected, the control (automatic control) of detour and deceleration is aborted, as one example. According to the processing at Step S22, the control that is different from the operation by the driver can be restrained from being performed, as one example.

Figure 10:
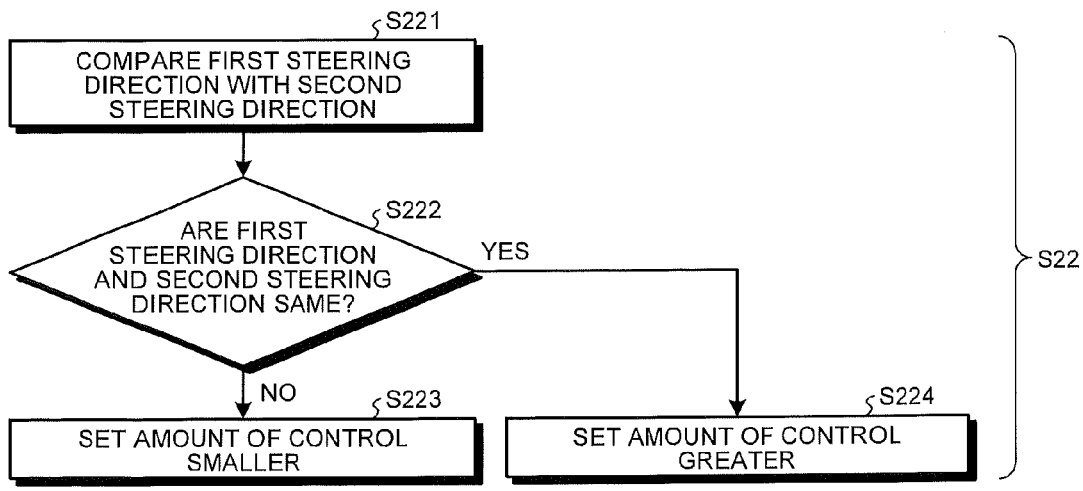
FIG. 10 is a flowchart (a part of the flowchart in FIG. 3) illustrating one example of the control method that gives priority to driver's operation performed by the vehicle-behavior control system in the embodiment.
Figure 11:
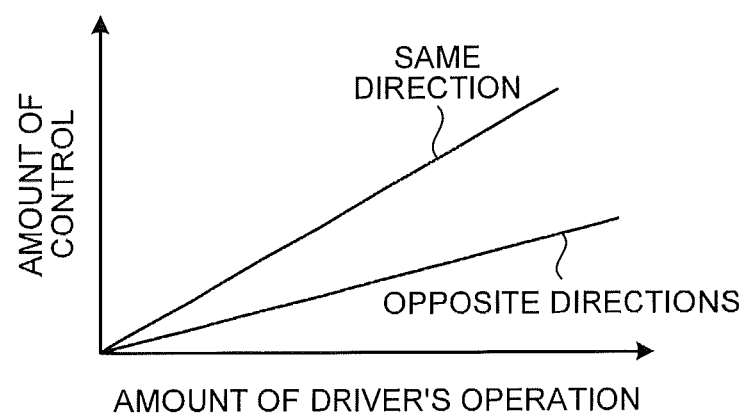
FIG. 11 is a graphic chart illustrating one example of setting of the amount of control corresponding to the amount of driver's operation in the vehicle-behavior control system in the embodiment.

More specifically, at Step S22, as illustrated in FIG. 10, for example, the vehicle-behavior control unit 10f first compares the steering direction from the neutral position of the rear wheels 3R when the control in response to the operation by the driver is started (defined as a first steering direction) with a steering control direction of the rear wheels 3R corresponding to the operation by the driver (a direction of steering the rear wheels 3R (performing steering control) to make the vehicle 1 turn in a direction corresponding to the operation by the driver, defined as a second steering direction) (Step S221). At Step S221, if the first steering direction and the second steering direction are in opposite directions (No at S222), the vehicle-behavior control unit 10f (the control device 10) controls the steering angle of the left and right rear wheels 3R, the braking forces of the left and right front wheels 3F and the rear wheels 3R, and the damping forces of the left and right front wheels 3F and the rear wheels 3R so as to be in the opposite states thereof to the beginning (in a state of the control of detour and deceleration being performed). In this case, in the embodiment, the vehicle-behavior control unit 10f (the control device 10) sets the amount of control thereof (steering angle, braking force, and damping force) smaller (moderately or relatively moderately), as one example (Step S223). On the other hand, if the first steering direction and the second steering direction are in the same direction (Yes at S222), the vehicle-behavior control unit 10f (the control device 10) sets the amount of control thereof (steering angle, braking force, and damping force) greater (abruptly or relatively abruptly) as compared with the case of being in opposite directions (Step S224). That is, in the embodiment, the vehicle-behavior control unit 10f (the control device 10) performs such control as illustrated in FIG. 11, as one example. The abscissa axis in FIG. 11 represents the amount of driver's operation (the operating amount of the steering wheel, as one example), and the ordinate axis represents the amount of control (or the coefficient thereof). That is, as apparent from FIG. 11, in the embodiment, the amount of control in the case of the same direction is set greater than the amount of control in the case of opposite directions, as one example. Consequently, the steering control or braking control in response to the operation by the driver can be performed more effectively while maintaining the vehicle 1 in a stable condition. The steering angle in this control can be a relative steering angle with respect to the steering angle at the time the control is started.

In the case of No at Step S19, the vehicle-behavior control unit 10f (the control device 10) returns to Step S16 if it is in a situation in which the time from the start of the control of detour and deceleration is not exceeding the control time T (No at Step S20), as one example.

On the other hand, the vehicle-behavior control unit 10f (the control device 10) performs ending control (Step S21) if it is in a situation in which the time from the start of the control of detour and deceleration is the same as the control time T or has exceeded the control time T (Yes at Step S20), as one example. At Step S20, it may be configured to return to Step S16 if the time from the start of the control of detour and deceleration is less than the control time T (i.e., has not exceeded, or is the same), and to move on to Step S21 if the time from the start of the control of detour and deceleration has exceeded the control time T.

At Step S21, at the time of ending the control of detour and deceleration, the vehicle-behavior control unit 10f performs control (ending control or stabilization control) such that the vehicle 1 can run more stably after the control is ended. As one example, the vehicle-behavior control unit 10f controls the steering device 7 (the actuator 7a) such that the steering angle of the wheels 3 (the rear wheels 3R) becomes zero or the yaw moment becomes zero.

As in the foregoing, in the embodiment, under the condition in which the wheels 3 are being braked, the second collision determining unit 10e determines, based on at least the detection result of the obstacle 20 in front of the vehicle 1 and the detection result of the running state of the vehicle 1, whether the vehicle 1 collides with the obstacle 20 when the vehicle 1 is decelerated while going straight, as one example. Consequently, according to the embodiment, depending on the running state of the vehicle 1 under the condition in which the wheels 3 are being braked, the probability of collision between the vehicle 1 and the obstacle 20 is likely to be determined with higher accuracy, as one example.

Furthermore, in the embodiment, the vehicle-behavior control unit 10f controls the steering device 7 of the rear wheels 3R, as one example. The rear wheels 3R are harder to lock as compared with the front wheels 3F. Consequently, according to the embodiment, by the steering control of the rear wheels 3R, the vehicle 1 is more likely to detour around the obstacle 20, as one example.

In the embodiment, the vehicle-behavior control unit 10f further controls the braking devices 6 such that the braking conditions differ between the left and right wheels 3, as one example. Consequently, according to the embodiment, by the braking control of the wheels 3, the vehicle 1 is more likely to detour around the obstacle 20, as one example.

In the embodiment, when the operation by the driver is detected, the operation by the driver has priority over the control by the vehicle-behavior control unit 10f, as one example. Consequently, according to the embodiment, the control that is different from the operation by the driver is likely to be restrained from being performed by the vehicle-behavior control unit 10f, as one example.

In the embodiment, the vehicle-behavior control unit 10f further varies the change rate of steering the rear wheels 3R, depending on whether the steering direction of the rear wheels 3R at the time the operation by the driver is detected and the steering control direction corresponding to the operation by the driver are in the same direction or in opposite directions, as one example. Consequently, according to the embodiment, the control in response to the operation by the driver is likely to be performed more effectively or more reliably while the vehicle 1 is maintained in a more stable condition, as one example.

In the embodiment, the vehicle-behavior control unit 10f further makes the time to perform the control shorter as the vehicle speed is in a higher state, based on the detection result of the running state of the vehicle 1, as one example. Consequently, according to the embodiment, the control of avoiding the collision with the obstacle 20 is restrained from being wastefully performed (continued) after the collision with the obstacle 20 has been avoided, as one example.

In the embodiment, the vehicle-behavior control unit 10f, in addition, starts the control of braking the rear wheels 3R after starting the control of steering the rear wheels 3R, as one example. Consequently, according to the embodiment, a greater yaw moment entailed in steering the rear wheels 3R is likely to be obtained, as one example.

In the embodiment, the vehicle-behavior control unit 10f, in addition, starts the control of braking the rear wheels 3R after starting the control of braking the front wheels 3F, as one example. Consequently, according to the embodiment, the braking of the front wheels 3F is likely to be used for the turn (detour) of the vehicle 1 more effectively, as one example.

In the embodiment, the vehicle-behavior control unit 10f further performs the control such that the rear wheels 3R are steered at a fixed steering speed regardless of the vehicle speed, as one example. Consequently, according to the embodiment, a greater yaw moment entailed in steering the rear wheels 3R is likely to be obtained, as one example.

In the embodiment, the operation of the braking system 61 that brakes the wheels 3 differs between when the control of detour and deceleration is performed by the vehicle-behavior control unit 10f and when the vehicle 1 is stopped (decelerated) without detouring, as one example. Consequently, according to the embodiment, the behavior of the vehicle 1 is likely to be controlled more effectively or more reliably, as one example.

In the embodiment, the vehicle-behavior control unit 10f further controls the damping characteristics of the suspension devices 4 of the wheels 3, as one example. Consequently, according to the embodiment, by the control of the damping characteristics of the suspension devices 4, the vehicle 1 is more likely to detour around the obstacle 20, as one example.

In the embodiment, the second collision determining unit 10e determines whether the collision with the obstacle 20 occurs depending on at least one of the detection result of the rotational speed of the wheels 3, the operating condition of the braking devices 6 of the wheels 3, and the detection result of the acceleration of the vehicle 1, as one example. Consequently, according to the embodiment, the probability of collision between the vehicle 1 and the obstacle 20 is likely to be determined with higher accuracy, as one example.

While the embodiment of the invention has been exemplified in the foregoing, the embodiment and modifications are mere examples and not intended to limit the scope of the invention. The foregoing embodiment and modifications can be implemented in various other forms and, without departing from the scope of the invention, various omissions, substitutions, combinations, and modifications can be performed. For example, the invention includes the configurations in which the control of collision avoidance by deceleration or detour is performed based on the detection result of an obstacle in front of a vehicle under the condition in which the vehicle is not being braked.

EXPLANATIONS OF LETTERS OR NUMERALS 1 vehicle
3 wheel
3F front wheel
3R rear wheel
4 suspension device
4b actuator
6 braking device
7 steering device
10 control device (vehicle-behavior control apparatus)
10e second collision determining unit (collision determining unit)
10f vehicle-behavior control unit
11 image pickup device (data acquisition unit)
12 radar device (data acquisition unit)
20 obstacle
100 vehicle-behavior control system

The invention claimed is:

1. A vehicle-behavior control apparatus comprising:
a collision determining unit that determines whether a vehicle collides with an obstacle when the vehicle is decelerated while going straight based on at least a detection result of the obstacle in front of the vehicle and a detection result of a running state of the vehicle in a condition in which wheels are being braked; and
a vehicle-behavior control unit that performs at least one of control of steering rear wheels and control of giving a difference in braking conditions between left and right wheels such that the vehicle is decelerated while detouring around the obstacle without steering front wheels when it is determined to collide with the obstacle by the collision determining unit,
wherein the vehicle-behavior control unit makes time to perform control shorter as a speed of the vehicle is in a higher state based on the detection result of the running state of the vehicle.

2. The vehicle-behavior control apparatus according to claim 1, wherein the vehicle-behavior control unit prioritizes an operation by a driver over the control by the vehicle-behavior control unit when the operation by the driver is detected.

3. The vehicle-behavior control apparatus according to claim 2, wherein, when a steering direction of the rear wheels at the time the operation by the driver is detected and a steering control direction of the rear wheels corresponding to the operation by the driver are different from each other, the vehicle-behavior control unit performs the control to steer the rear wheels more moderately as compared with when the steering direction of the rear wheels at the time the operation by the driver is detected and the steering control direction of the rear wheels corresponding to the operation by the driver are same.

4. The vehicle-behavior control apparatus according to claim 1, wherein the vehicle-behavior control unit starts control of braking the rear wheels after starting control of steering the rear wheels.

5. The vehicle-behavior control apparatus according to claim 1, wherein the vehicle-behavior control unit starts control of braking the rear wheels after starting control of braking the front wheels.

6. The vehicle-behavior control apparatus according to claim 1, wherein the vehicle-behavior control unit performs control such that the rear wheels are steered at a fixed steering speed regardless of a speed of the vehicle.

7. The vehicle-behavior control apparatus according to claim 1, wherein operation of a braking system that brakes the wheels differs between when control of detour and deceleration is performed by the vehicle-behavior control unit and when the vehicle is stopped without detouring.

8. The vehicle-behavior control apparatus according to claim 1, wherein the vehicle-behavior control unit further controls damping characteristics of a suspension device of the wheel.

9. The vehicle-behavior control apparatus according to claim 1, wherein the collision determining unit detects the running state of the vehicle, and determines whether collision with the obstacle occurs depending on at least one of a detection result of rotational speed of the wheels, operating conditions of braking devices of the wheels, and a detection result of acceleration of the vehicle.

10. The vehicle-behavior control apparatus according to claim 1, further comprising:
an obstacle detection unit that detects the obstacle in front of the vehicle; and
a running-state detection unit that detects the running state of the vehicle.

11. A vehicle-behavior control apparatus comprising:
a collision determining unit that determines whether collision with an obstacle occurs based on at least one of a detection result of the obstacle in front of a vehicle and a detection result of a running state of the vehicle; and
a vehicle-behavior control unit that performs at least one of control of steering rear wheels and control of giving a difference in braking conditions between left and right wheels such that the vehicle is decelerated while detouring around the obstacle without steering front wheels when it is determined to collide with the obstacle by the collision determining unit,
wherein the vehicle-behavior control unit makes time to perform control shorter as a speed of the vehicle is in a higher state based on the detection result of the running state of the vehicle.

12. The vehicle-behavior control apparatus according to claim 11, further comprising:
an obstacle detection unit that detects the obstacle in front of the vehicle; and
a running-state detection unit that detects the running state of the vehicle.

13. A vehicle-behavior control system comprising:
a data acquisition unit that acquires data to be a source of detecting an obstacle in front of a vehicle;
a steering device of rear wheels;
a braking device of wheels; and
a control device including a collision determining unit and a vehicle-behavior control unit, the collision determining unit determining whether the vehicle collides with the obstacle when the vehicle is decelerated while going straight based on at least a detection result of the obstacle in front of the vehicle and a detection result of a running state of the vehicle in a condition in which the wheels are being braked, the vehicle-behavior control unit performing at least one of control of steering the rear wheels and control of giving a difference in braking conditions between left and right wheels such that the vehicle is decelerated while detouring around the obstacle without steering front wheels when it is determined to collide with the obstacle by the collision determining unit, wherein the vehicle-behavior control unit makes time to perform control shorter as a speed of the vehicle is in a higher state based on the detection result of the running state of the vehicle.

14. The vehicle-behavior control system according to claim 13, further comprising an actuator that controls damping characteristics of a suspension device of the wheel.

* * * * *